United States Patent [19]

Austin

[11] 4,049,346
[45] Sept. 20, 1977

[54] CAMERA PROJECTOR WITH TURRET

[75] Inventor: Cecil Alfred Austin, Crawley, England

[73] Assignee: Pictorial Machinery Limited, Crawley, England

[21] Appl. No.: 686,079

[22] Filed: May 13, 1976

[30] Foreign Application Priority Data

May 23, 1975 United Kingdom ............... 22826/75

[51] Int. Cl.² ....................... G03B 27/70; G03B 13/28
[52] U.S. Cl. .......................................... 355/45; 355/66
[58] Field of Search ........................ 355/36, 46, 60, 66, 355/65, 73, 64, 18, 45, 43

[56] References Cited

U.S. PATENT DOCUMENTS

| 1,347,824 | 7/1920 | Pifer | 355/73 |
| 2,938,427 | 5/1960 | Alves | 355/45 |
| 3,322,487 | 5/1967 | Renner | 355/45 X |
| 3,548,730 | 12/1970 | Verge | 355/45 X |
| 3,592,539 | 7/1971 | Haslam | 355/60 X |
| 3,642,367 | 2/1972 | Ruff | 355/66 X |

FOREIGN PATENT DOCUMENTS

| 179,410 | 12/1906 | Germany | 355/60 |
| 1,076,667 | 7/1967 | United Kingdom | 355/18 |

*Primary Examiner*—Donald A. Griffin
*Attorney, Agent, or Firm*—Morgan, Finnegan, Pine, Foley & Lee

[57] ABSTRACT

A photographic copying machine constructed to accommodate a camera, an image projector and an image viewer in respective locations, and a lens system which is common to the camera, projector and viewer. The machine also includes a rotatable turret mounting a plane mirror, by which the lens system can be coupled for use with each of the camera, projector and viewer selectively.

8 Claims, 3 Drawing Figures

CAMERA PROJECTOR WITH TURRET

This invention relates to a photographic copying machine which includes a camera, a projector and an image viewer, and also relates to an optical system suitable for use in such a machine.

It has been proposed to provide, in a photographic copying machine, facility for inserting either a projector or a focussing screen in place of the camera. The changing of the mode of operation of the machine accordingly requires partial dismantling of the machine and is time consuming and inconvenient. The present invention has for its principal object the improvement and simplification of changing the mode of operation of a photographic copying machine.

According to the invention, a photographic copying machine is constructed to accommodate a camera, an image projector and an image viewer in respective locations and a lens system which is common to the camera, projector and viewer, and includes adjustable means by which the lens system can be coupled for use with each of the camera, projector and viewer selectively.

Preferably the adjustable means includes a rotatable turret which mounts a mirror with inclination relative to an optical path extending through the lens system and for rotation about said path so as to couple each of the camera, projector and viewer to the lens system, and means operable in conjunction with the turret to block the passage of light to and from those two of the camera, projector and viewer which are not selected for coupling to the lens system. The turret may comprise a screen which is apertured to allow light to pass to one of the said positions at a time.

The camera, projector and viewer may each be disposed to have focal planes which are parallel to the aforementioned optical path; the mirror may be inclined at 45° to said optical path.

In a preferred arrangement, the camera, projector and viewer together with the lens system and turret may be mounted on a common carriage which is adjustable lengthwise of the aforementioned optical path. The lens system and the aforementioned turret may be mounted in a common frame which includes means for adjusting the lens system lengthwise of said optical path relative to the mirror. The said optical path may be horizontal; in such a case the projection screen with which the machine may be used would normally be disposed in a vertical plane. Such an arrangement is convenient because the carriage may be mounted for movement along a horizontal track. Such an arrangement is desirable if the machine is heavy and bulky, but if desired the optical path might be vertical.

According to another aspect of this invention, there is provided, in or for a photographic copying machine, a lens system, a planar mirror which is inclined to the axis of the lens, a turret which mounts the mirror for rotation about that axis and an indexing assembly which is operable to secure the turret in any of a plurality of angularly spaced positions, the turret including a screen which blocks light except that passing through the lens system and reflected from the mirror.

There follows a description by way of example of one embodiment of the present invention. Reference will be made to the accompanying drawings, of which:

Figure 1:
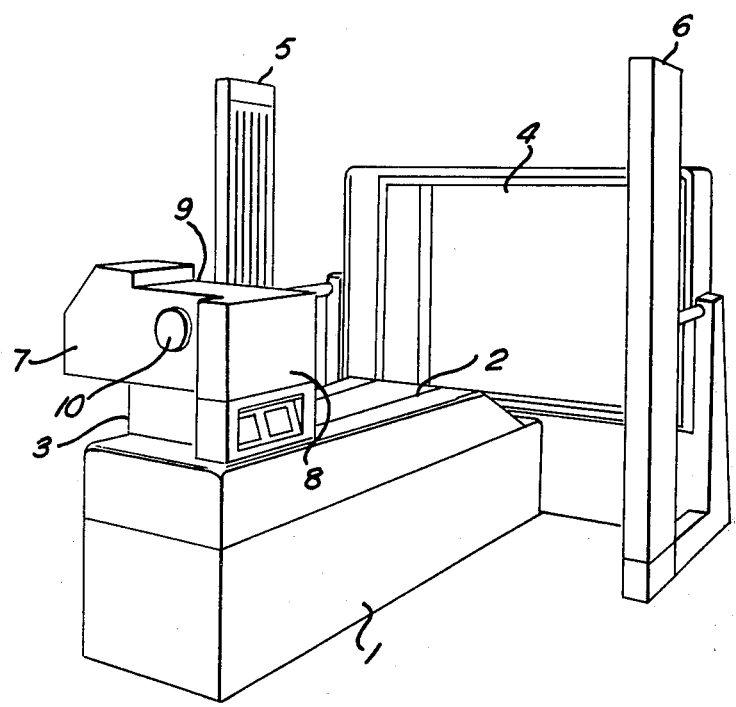
FIG. 1 illustrates a simplified diagrammatic view of a photographic copying machine.

FIG. 1 illustrates a general view of the copying machine. The machine is mounted on a base 1 which includes a horizontal track 2 along which a main carriage 3 can be traversed towards and away from a screen 4. It is possible either to project onto the screen or to support on it originals which require copying according to the desired mode of operation of the machine. On each side of the base 1 and the screen 4 is a vertical, elongate light source (5, 6 respectively) which serves to illuminate the screen 4 as required.

Figure 2:
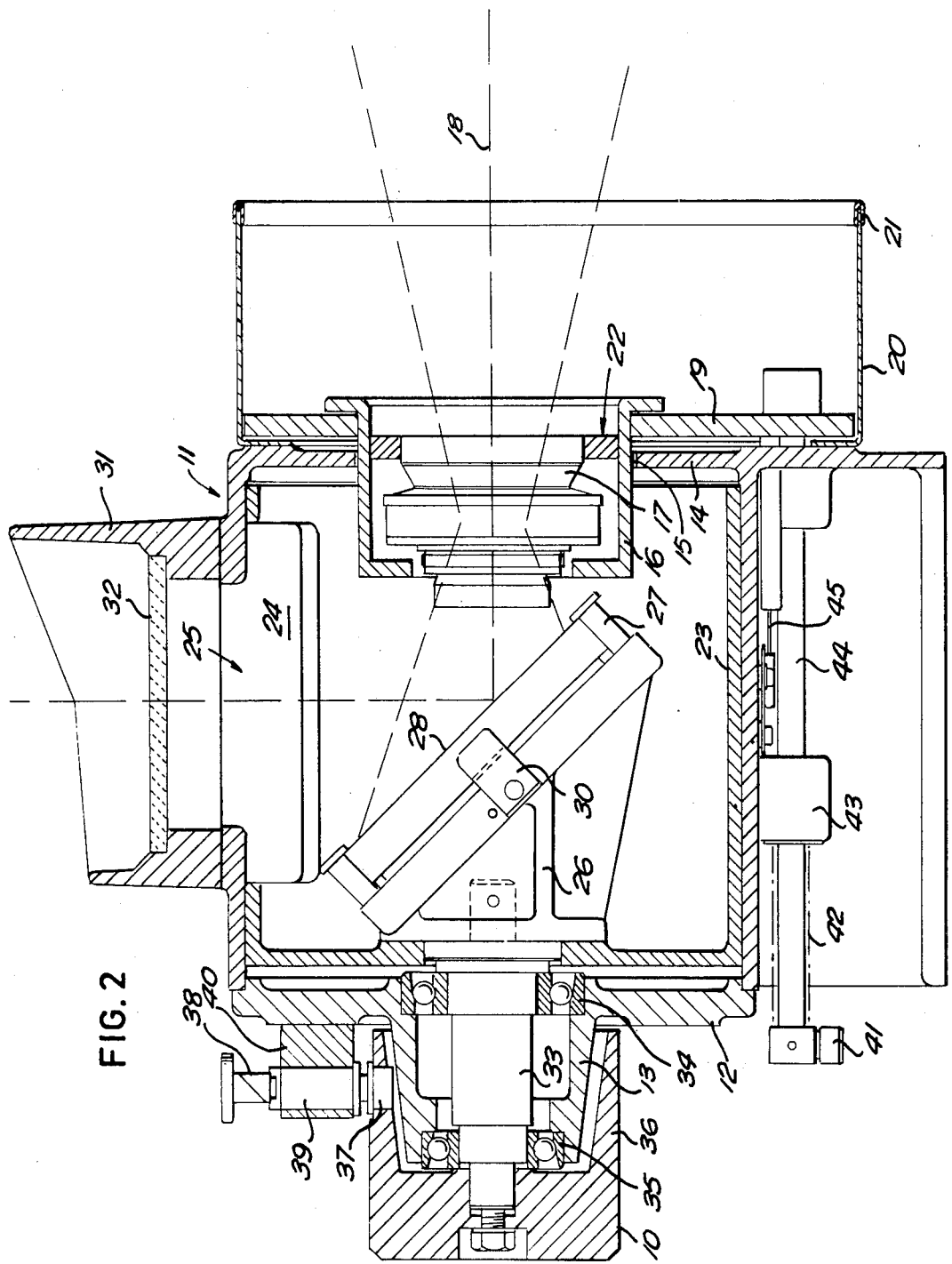
FIG. 2 is a sectional view of a turret head forming part of the machine.

On the carriage 3 are disposed a projector 7, a camera 8 and a viewing screen 9 which is more clearly shown in FIG. 2. The projector 7 may be of ordinary construction, being capable of projecting an image of a transparency through a lens system, which is not shown and is common to the other modes of operation of the machine. The projector 7 may be, if desired, removable from the main carriage 3. The camera 8 is preferably a roll film camera accommodating, for example, 105 mm film. Likewise, this camera may be, if desired, removable from its position on the carriage. However, as will be explained, it is not necessary to remove either the camera or the projector or the viewing screen from the carriage when changing the machine from one mode of operation to another.

The carriage 3 includes a rotary cap 10 which is more particularly described with reference to FIG. 2. This cap forms part of a turret head by which the camera, the projector and the viewing screen may be selectively coupled to a lens system, not shown in FIG. 1. The turret also serves to operate various switches which constitute interlocks, allowing only the camera or the projector as the case may be to operate when each is coupled to the lens system.

FIG. 2 illustrates the lens system and the turret head which incorporates it and the mirror by which an optical path through the lens system is diverted towards a viewing screen or the camera or the projector according to the wishes of an operator.

The turret assembly has a frame in the form of a turret box 11. At one end the turret box has an end plate 12 which is provided with a central, outwardly extending flange 13 for the accommodation of a shaft and bearings to be described. At its front end the turret box has a front plate 14 which has a central aperture 15. This aperture accommodates a lens box 16 which serves as a mount for a lens 17. This lens provides a principal optical path 18 along its axis. The lens box 16 is accommodated and fixed in a lens panel 19 which is disposed within the lens shroud 20 secured to the front panel of the turret box. The leading circular edge of the lens shroud is provided with an edging strip 21. The lens is secured in the lens box, and a seal 22 surrounding the lens 17 prevents light from entering the turret box except through the lens.

Within the turret box is a rotary drum 23 which in this embodiment serves partly as a turret and partly as a screen. The drum has an aperture 24 which in the configuration shown in the drawing is shown in register with a top aperture 25 in the turret box. The rest of the curved part of the drum is solid so that light can pass into and out of the drum substantially only by means of the aperture 24. From the left-hand end plate of the drum there extends into the interior of the drum a mount 26. This carries three clamping blocks 27 which support a mirror 28. The mirror is restrained by guides 30 on the mount 26. The mirror is inclined at 45° to the axis of the lens. Accordingly, it diverts through 90° the principal optical path through the lens.

At the top of the turret box assembly is a hood 31. In this embodiment the hood accommodates, in a plane parallel to the optical axis of the lens, a ground-glass plate 32 which is preferably removable. The ground-glass plate is a focussing screen.

To the rear of the drum there extends a shaft 33, which supports the drum and is itself supported in the annular flange 13 by two spaced apart bearings 34 and 35. At its outer end the shaft carries the cap 10 which has a forwardly extending annular flange 36 covering the flange 13 on the end plate 12. The flange of the end cap 10 has a socket 37 with a radial bore. Three of these sockets are provided at 90° intervals about the end cap. Each of them can be engaged by a manually operable plunger 38 which is mounted in a bore 39 in a block 40 secured to the rear of the end plate 12.

The lens box and accordingly the lens may be traversed forwardly and rearwardly with respect to the mirror by means of a cam, not shown, which drives a cam follower 41 itself coupled to displace longitudinally a plurality of parallel bars 44 which extend parallel to the axis of the lens through bearing bushes 43, carried on the underside of the turret box, to the lens panel 19 where the bars are secured to move the lens 17. Compression springs 42 are assembled to the bars 44 between the bushes 43 and the cam follower 41 to bias the cam follower rearwards, and consequently to bias the lens 17 toward the mirror 28. A cable guide 45 is a link between the lens panel 19 and the lamp of the projector 7 (not shown in FIG. 2), to maintain this lamp at a constant distance from the lens when the focus is changed by the action of the cam on the cam follower 41.

Figure 3:
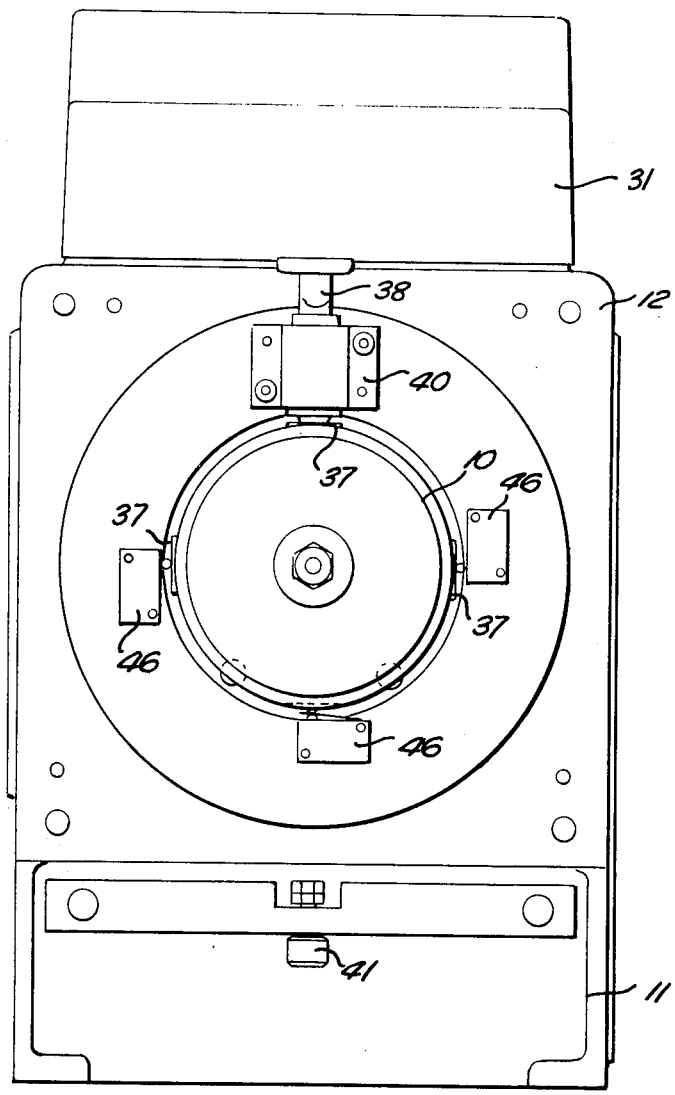
FIG. 3 is a rear end view of the turret head illustrated in FIG. 2.

As shown in FIG. 3 the end cap cooperates with microswitches 46 disposed on the end plate.

In this embodiment, the ground-glass screen 32 may be replaced by a photographic film or plate holder which can be used for taking single photographs.

It will be appreciated that the focal plane of the camera and the projector are parallel to the plane of the paper in FIG. 2 and disposed in front of the figure and behind the figure respectively.

Rotation of the mirror 28 serves to couple optically either the camera or the screen 32 (or the photographic plate in place thereof), or the projector to the lens system. The aperture in the turret drum 23 is aligned so that only light which is reflected from the mirror and passes through the lens system passes through that aperture.

It is accordingly possible, with the arragement that has been described, to focus the lens system properly using the screen 32, then by simple rotary movement to couple either the projector or the camera to the lens, whereupon, by virtue of the simple rotary movement required, they do not require additional focussing. If it is desired to take single photographs rather than a multiplicity of exposures using the roll film of the camera, the ground-glass screen can simply be removed and changed for a photographic plate or film holder.

I claim:

1. A photographic copying machine including a camera, an image projector and an image viewer mounted at respective locations, a lens system which is common to said camera, said projector and said viewer, and adjustable means, including a mirror mounted to be selectively movable between three positions in each of which said mirror is disposed in the path of light passing through said lens system and couples a respective one of said camera, said projector and said viewer with said lens system.

2. A photographic copying machine according to claim 1 wherein the adjustable means further includes a rotatable turret which mounts the mirror with inclination relative to an optical path extending through the lens system and for rotation about said path so as to couple each of the camera, projector and viewer selectively to the lens system, and means operable in conjunction with the turret to block the passage of light to and from those two of the camera, projector and viewer which are not selected for coupling to the lens system.

3. A photographic copying machine according to claim 2 wherein the turret comprises a screen which is apertured to allow light to pass to one of the said locations at a time.

4. A photographic copying machine according to claim 2 and adapted to accommodate the camera, projector and viewer each to have focal planes which are parallel to the optical path, the mirror being inclined at 45° to said optical path.

5. A photographic copying machine according to claim 2 wherein the camera, projector and viewer together with the lens system and turret are mounted on a common carriage which is adjustable lengthwise of the optical path.

6. A photographic copying machine according to claim 5 wherein the carriage is mounted for movement along a track which extends lengthwise of the optical path.

7. A photograhic copying machine according to claim 2 wherein the lens system and turret are mounted in a common frame which includes means for adjusting the lens system lengthwise of said optical path relative to the mirror.

8. A photographic copying machine according to claim 2 constructed and arranged so that, the optical path is horizontal when the machine is supported on a horizontal surface.

* * * * *